United States Patent
Renius et al.

(10) Patent No.: US 9,434,352 B2
(45) Date of Patent: Sep. 6, 2016

(54) ANTENNA ON GLASS WITH INTEGRAL ANTI-THEFT FEATURE

(71) Applicant: GM Global Technology Operations LLC, Detroit, MI (US)

(72) Inventors: Paul W. Renius, Metamora, MI (US); David T. Renke, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 13/928,913

(22) Filed: Jun. 27, 2013

(65) Prior Publication Data
US 2015/0002283 A1    Jan. 1, 2015

(51) Int. Cl.
| | | |
|---|---|---|
| B60R 25/10 | (2013.01) | |
| B60R 25/34 | (2013.01) | |
| H01Q 1/12 | (2006.01) | |
| H01Q 7/00 | (2006.01) | |
| H01Q 9/30 | (2006.01) | |
| H01Q 5/371 | (2015.01) | |
| H01Q 5/40 | (2015.01) | |

(52) U.S. Cl.
CPC .............. *B60R 25/34* (2013.01); *H01Q 1/1271* (2013.01); *H01Q 5/371* (2015.01); *H01Q 5/40* (2015.01); *H01Q 7/00* (2013.01); *H01Q 9/30* (2013.01)

(58) Field of Classification Search
CPC ........ B60R 25/30; B60R 25/34; G08B 13/08
USPC .............................. 340/426.27, 539.1, 425.5
See application file for complete search history.

(56) References Cited

U.S. PATENT DOCUMENTS

| | | | | |
|---|---|---|---|---|
| 5,461,391 A | * | 10/1995 | Ohnishi | H01Q 1/1278 343/704 |
| 5,581,264 A | * | 12/1996 | Tabata | H01Q 1/1271 343/704 |
| 5,661,385 A | * | 8/1997 | McEwan | E05F 15/431 318/478 |
| 6,275,157 B1 | * | 8/2001 | Mays | B32B 17/06 340/572.5 |
| 6,310,580 B2 | * | 10/2001 | Taniguchi | 343/713 |
| 6,822,613 B2 | * | 11/2004 | Kubota | H01Q 7/00 343/713 |
| 7,286,098 B2 | | 10/2007 | Ogino et al. | |
| 8,294,624 B2 | * | 10/2012 | Yamamoto | H01Q 1/1271 343/711 |
| 2005/0052334 A1 | * | 3/2005 | Ogino et al. | 343/866 |
| 2008/0062053 A1 | * | 3/2008 | Marko | H01Q 1/3291 343/713 |

FOREIGN PATENT DOCUMENTS

| | | |
|---|---|---|
| CN | 1591977 A | 3/2005 |
| CN | 201784574 | 4/2011 |
| CN | 201784574 U | 4/2011 |
| DE | 3630519 | 3/1988 |
| DE | 3630519 A1 | 3/1988 |
| DE | 19501103 | 7/1996 |
| DE | 19501103 A1 | 7/1996 |
| JP | 2009295109 A | 12/2009 |

OTHER PUBLICATIONS

Chinese Office Action for Application No. 201410295611.3 dated Dec. 17, 2015, 6 pages.

* cited by examiner

*Primary Examiner* — Daryl Pope
(74) *Attorney, Agent, or Firm* — Cantor Colburn LLP

(57) ABSTRACT

A vehicle glass assembly includes a glass pane of tempered glass, a frequency modulation (FM) antenna loop coupled to the glass pane and a first connector configured to provide a signal path to an FM radio tuner module. A second connector is coupled to the FM antenna loop to form an anti-theft loop in conjunction with the first connector. The first and second connectors are configured to provide signal paths to a security module.

14 Claims, 5 Drawing Sheets

ANTENNA ON GLASS WITH INTEGRAL ANTI-THEFT FEATURE

FIELD OF THE INVENTION

Exemplary embodiments of the invention relate to glass for a vehicle and, more particularly, to an antenna on vehicle glass with an integral anti-theft feature.

BACKGROUND

To reduce the risk of damage and for aesthetics, vehicle glass may incorporate an antenna for radio reception rather than use a separate physical structure such as an external antenna. Vehicles can include separate antennas for AM radio, FM radio, satellite radio, as well as other antennas for items such as cellular phones, television, citizens' band radio, and the like. Radio antennas are typically coupled to a radio tuner that includes electronics to tune into particular frequencies and provide audio output of received radio signals.

Vehicles may also include security features to deter and detect a break-in. Vehicle security features, also referred to as anti-theft features, are typically connected to alarm electronics that may signal a response upon detecting, for example, vehicle glass breakage. The alarm electronics are typically incorporated in a separate module of a vehicle subsystem that is independent of the vehicle radio, as radio theft may be another detectable event of the alarm electronics.

SUMMARY OF THE INVENTION

In one exemplary embodiment of the invention, a vehicle glass assembly includes a glass pane of tempered glass, a frequency modulation (FM) antenna loop coupled to the glass pane and a first connector configured to provide a signal path to an FM radio tuner module. A second connector is coupled to the FM antenna loop to form an anti-theft loop in conjunction with the first connector. The first and second connectors are configured to provide signal paths to a security module.

Another exemplary embodiment of the invention is a vehicle system including a vehicle glass assembly. The vehicle glass assembly includes a glass pane of tempered glass and a frequency modulation (FM) antenna loop coupled to the glass pane and a first connector. A second connector is coupled to the FM antenna loop to form an anti-theft loop in conjunction with the first connector. There is a first signal path between the first connector and a vehicle electronics subsystem, and a second signal path is between the second connector and the vehicle electronics subsystem. The vehicle electronics subsystem includes a selection module configured to selectively electrically connect at least one of the first and second signal paths to an FM radio tuner module, and to selectively electrically connect the first and second signal paths to a security module when the first and second signal paths are not electrically connected to the FM radio tuner module.

In a further exemplary embodiment of the invention, a method includes determining, by a switch module of a vehicle electronics subsystem, that a radio mode is active based on one or more vehicle inputs. The method also includes electrically connecting, by a selection module of the vehicle electronics subsystem, at least one of a first and second signal paths to a frequency modulation (FM) radio tuner module based on the radio mode being set active. There is a first signal path between the vehicle electronics subsystem and a first connector of an FM antenna loop coupled to a glass pane of tempered glass, and the second signal path is between the vehicle electronics subsystem and a second connector of the FM antenna loop that forms an anti-theft loop in conjunction with the first connector. The method further includes electrically connecting, by the selection module of the vehicle electronics subsystem, the first and second signal paths to a security module based on the radio mode being set inactive such that the first and second signal paths are not electrically connected to the FM radio tuner module when the radio mode is set inactive.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
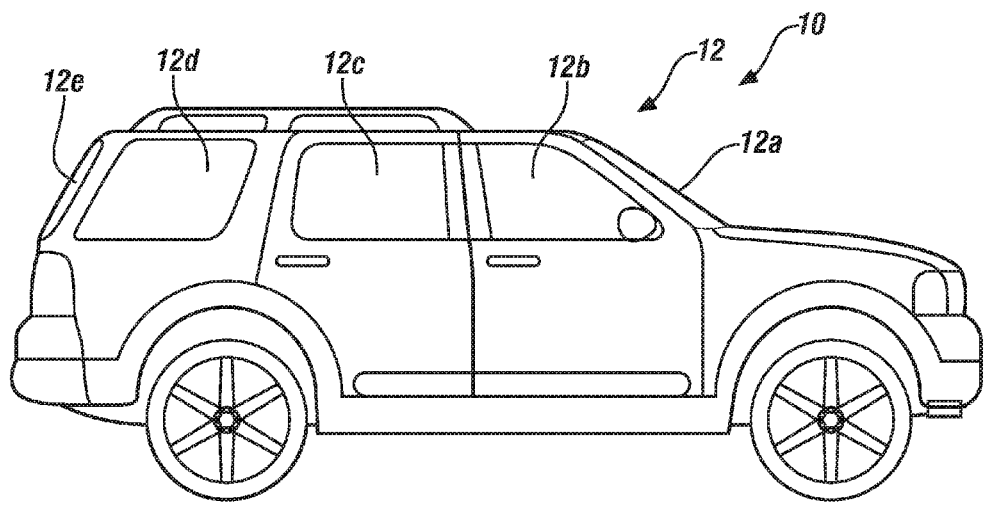
FIG. 1 is an illustration of an exemplary right side view of a vehicle.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry, such as an application specific integrated circuit (ASIC), an electronic circuit, a processor (shared, dedicated, or group) and memory that executes one or more software or firmware programs, a combinational logic circuit, and/or other suitable components that provide the described functionality. A module can include analog and/or digital circuitry.

Figure 2:
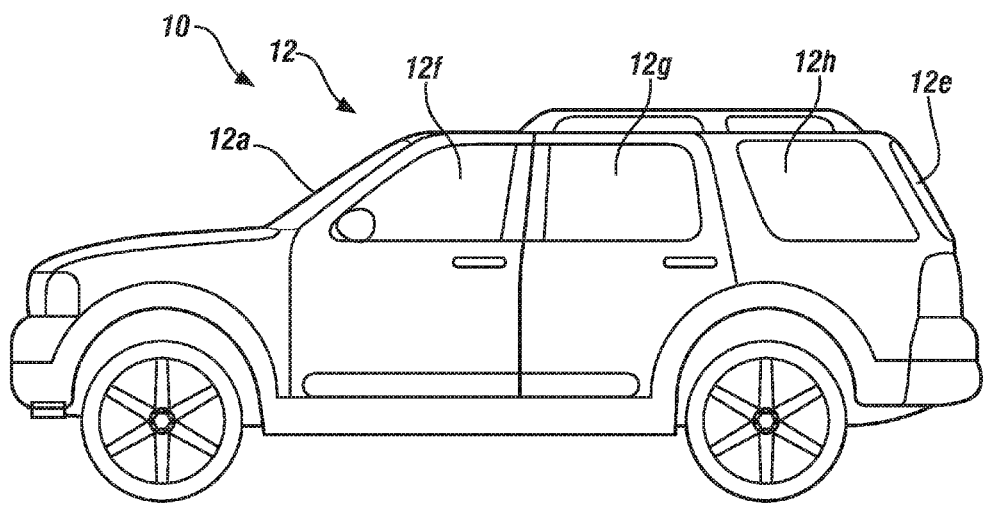
FIG. 2 is an illustration of an exemplary left side view of the vehicle of FIG. 1.

In accordance with an exemplary embodiment of the invention, as depicted in FIGS. 1 and 2, a vehicle 10 includes a plurality of vehicle glass assemblies 12. The example vehicle glass assemblies 12 include a windshield 12a, a front right-side window 12b, a rear right-side window 12c, a rear right-quarter window 12d, a rear window 12e, a front left-side window 12f, a rear left-side window 12g, and a rear left-quarter window 12h. The vehicle 10 may also include other vehicle glass assemblies 12 (not depicted) such as a sunroof, moonroof, or other glass panels.

Figure 3:
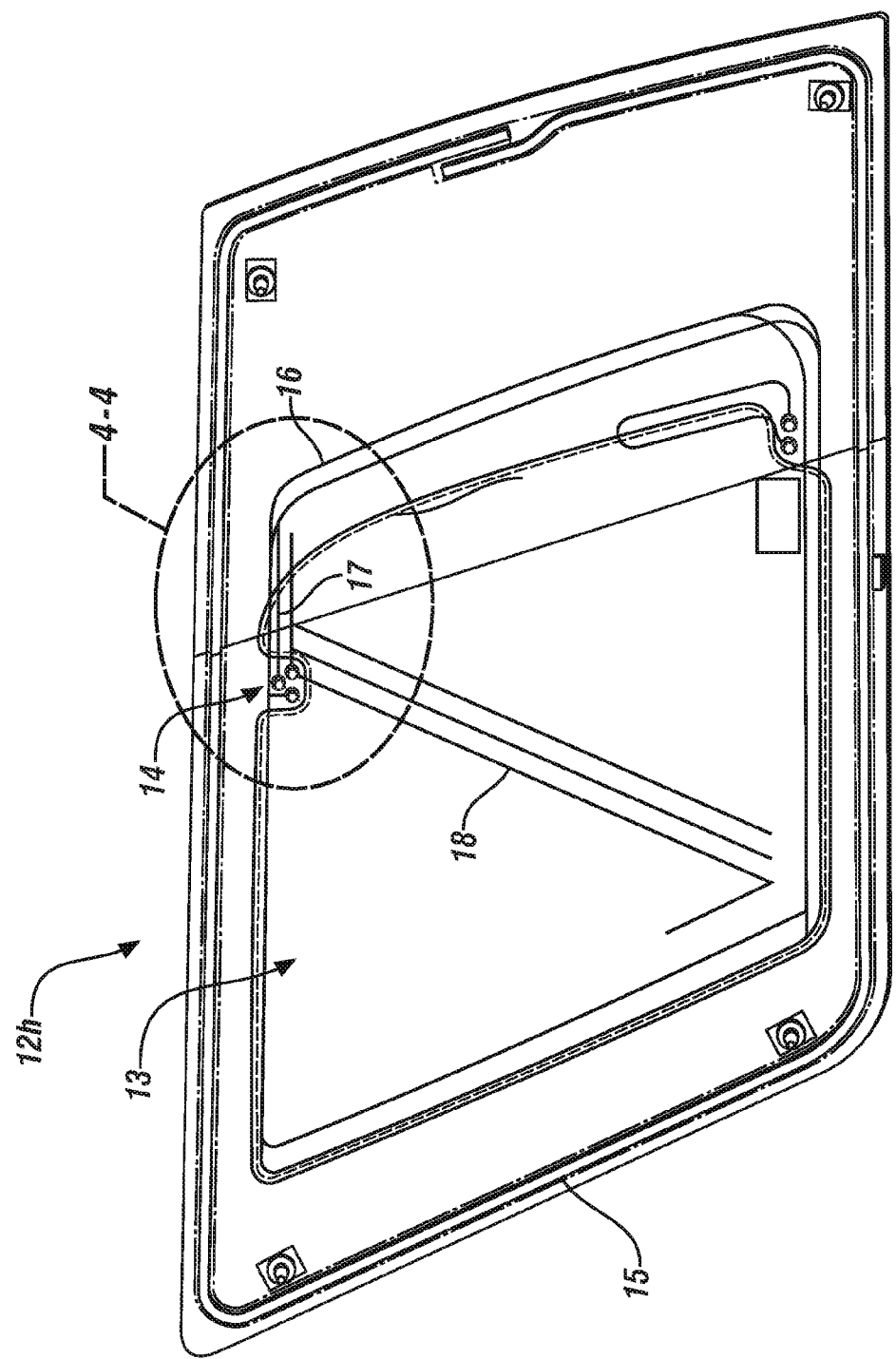
FIG. 3 is an illustration of a rear quarter window assembly of the vehicle of FIG. 2.

FIG. 3 is an illustration of the rear left-quarter window 12h of the vehicle 10 of FIG. 2, which is also referred to generally as a vehicle glass assembly. The rear right-quarter window 12d of the vehicle 10 of FIG. 1 can be similarly configured. The example rear left-quarter window 12h of FIG. 3 includes a glass pane 13, a plurality of connectors 14, and a frame 15. The connectors 14 are connected to a frequency modulation (FM) antenna loop 16 and an amplitude modulation (AM) antenna 18 that are on the glass pane 13. The FM antenna loop 16 and the AM antenna 18 may be formed as specific shapes or grids which are sized to receive FM and AM radio frequency signals respectively. In an exemplary embodiment, the FM antenna loop 16 is formed from a silver-ceramic paste applied to the glass pane 13. The AM antenna 18 may also be formed from a silver-ceramic paste applied to the glass pane 13. For safety and strength, the glass pane 13 is tempered glass, which when broken, crumbles into small granular chunks. Breaking of the glass pane 13 also results in breaking of the FM antenna loop 16. An anti-theft loop 17 is formed in conjunction with the FM antenna loop 16 such that breaking of the glass pane 13 results in a detectable loss of electrical continuity in the anti-theft loop 17. An area 4-4 of the rear left-quarter window 12h is depicted in greater detail in FIG. 4.

Figure 4:
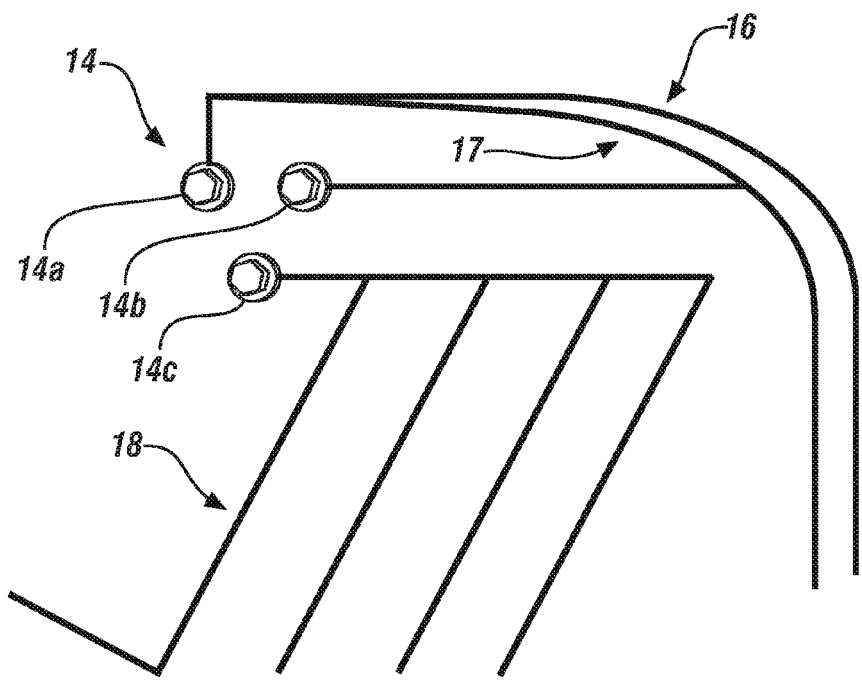
FIG. 4 is a detailed view of a combined FM antenna loop and anti-theft loop of FIG. 3.

FIG. 4 depicts a portion of the combined FM antenna loop 16 and anti-theft loop 17 from the example of FIG. 3. The connectors 14 depicted in FIG. 4 include a first connector 14a, a second connector 14b, and a third connector 14c. The first connector 14a is coupled to the FM antenna loop 16. The second connector 14b is also coupled to the FM antenna loop 16 and forms the anti-theft loop 17 in conjunction with the first connector 14a. The FM antenna loop 16 may be functional as an FM antenna by connecting either or both of the first and second connectors 14a and 14b to an FM radio tuner module, such as FM radio tuner module 28 of FIG. 7. The anti-theft loop 17 may be separately connected to a security module, such as security module 36 of FIG. 7. The third connector 14c is coupled to the AM antenna 18 and may be separately connected to an AM radio turner module, such as AM radio turner module 30 of FIG. 7.

Figure 5:
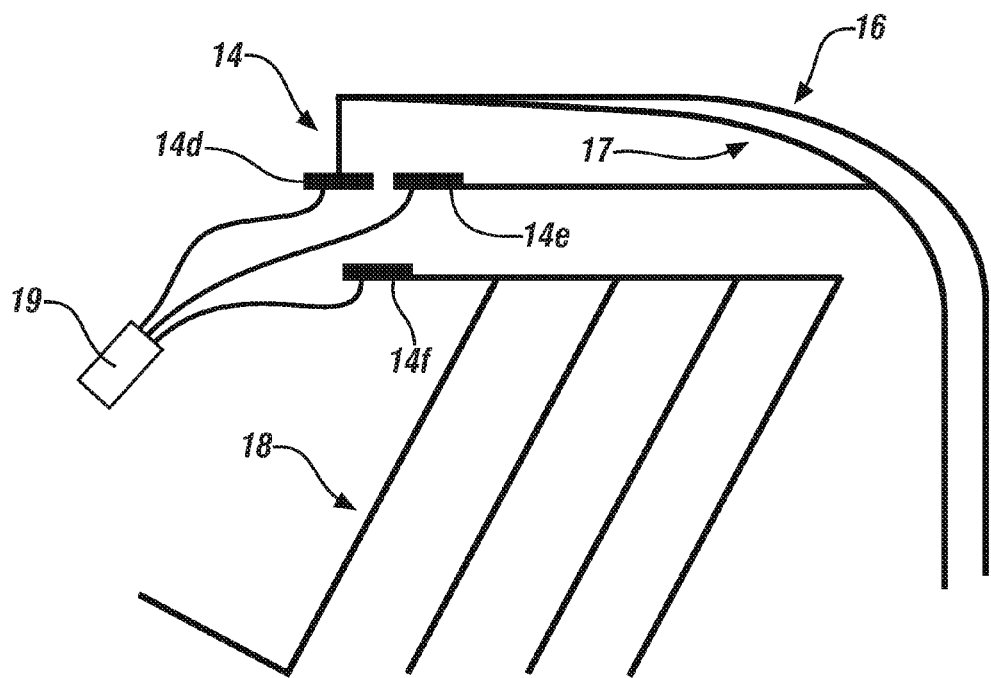
FIG. 5 is another example of a combined FM antenna loop and anti-theft loop.

In the example of FIG. 4, the connectors 14a, 14b, and 14c are button-type connectors. FIG. 5 depicts an alternate embodiment, where the connectors 14 are pigtail connectors. In the example of FIG. 5, the FM antenna loop 16, anti-theft loop 17, and AM antenna 18 are the same as depicted in FIG. 4. The connectors 14a, 14b, and 14c of FIG. 4 are replaced by connectors 14d, 14e, and 14f respectively in FIG. 5. The connectors 14d, 14e, and 14f may be connected to a pigtail coupler 19 that provides a connection point for a bundle of wires, cable, or other signal paths.

Figure 6:
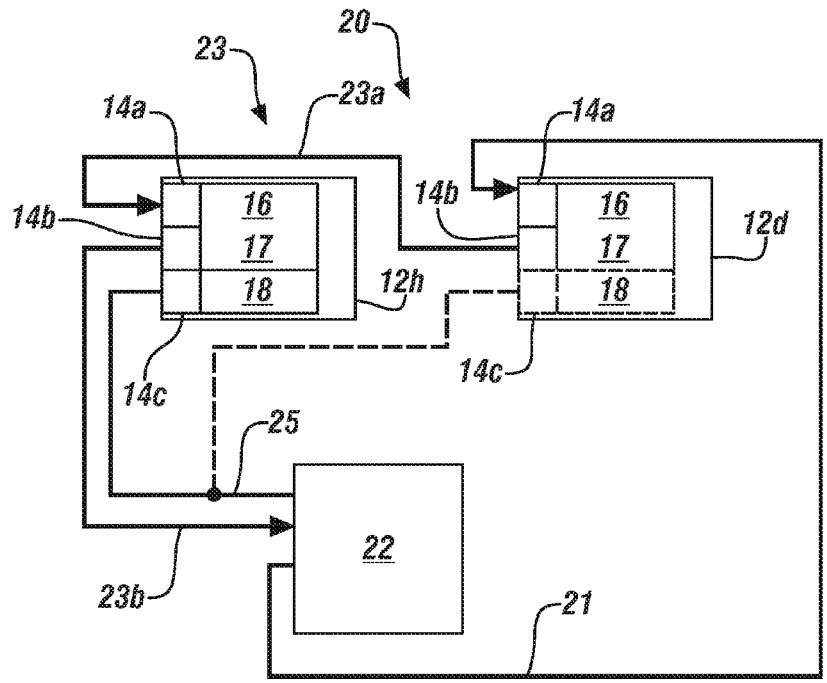
FIG. 6 is a schematic view of a vehicle system including multiple FM antenna loops connected to a vehicle electronics subsystem.

FIG. 6 is a schematic view of a vehicle system 20 including multiple FM antenna loops 16 and anti-theft loops 17 of FIGS. 3-5 connected to a vehicle electronics subsystem 22. The vehicle system 20 includes the rear right-quarter window 12d and the rear left-quarter window 12h of FIGS. 1 and 2. In this example, the rear right-quarter window 12d may be referred to as a first vehicle glass assembly and the rear left-quarter window 12h may be referred to as a second vehicle glass assembly which each include a pane of tempered glass (i.e., a first and second glass pane), such as the glass pane 13 of FIG. 3. The FM antenna loop 16 of the rear right-quarter window 12d may be referred to as a first FM antenna loop, and the FM antenna loop 16 of the rear left-quarter window 12h may be referred to as a second FM antenna loop. Similarly, the anti-theft loop 17 of the rear right-quarter window 12d may be referred to as a first anti-theft loop, and the anti-theft loop 17 of the rear left-quarter window 12h may be referred to as a second anti-theft loop.

In the example configuration of FIG. 6, a first signal path 21 is electrically connected between the first connector 14a of the rear right-quarter window 12d and the vehicle electronics subsystem 22. A second signal path 23 is electrically connected between the second connector 14b of the rear right-quarter window 12d and the vehicle electronics subsystem 22 by passing through the rear left-quarter window 12h. The second signal path 23 includes a first portion 23a that is electrically connected between the second connector 14b of the rear right-quarter window 12d and the first connector 14a of the rear left-quarter window 12h. The second signal path 23 also includes a second portion 23b that is electrically connected between the second connector 14b of the rear left-quarter window 12h and the vehicle electronics subsystem 22. Accordingly, a complete loop is formed such that breakage of either or both of the windows 12d and 12h results in a loss of electrical continuity.

In the embodiment of FIG. 6, a third signal path 25 is formed between the vehicle electronics subsystem 22 and one or more AM antennas 18 of FIGS. 3-5. For example, a single AM antenna 18 can be installed on either of the windows 12d or 12h. Alternatively, both of the windows 12d and 12h can include AM antennas 18 electrically connected to the vehicle electronics subsystem 22.

While the example of FIG. 6 depicts FM antenna loops 16 and anti-theft loops 17 of a pair of windows 12d and 12h connected in series, it will be understood that other combinations are possible. For example, additional loops (not depicted) of additional vehicle glass assemblies 12 can be connected in series or parallel combinations to the vehicle electronics subsystem 22. Alternatively, each of the windows 12d and 12h can be separately connected to the vehicle electronics subsystem 22 in a parallel arrangement.

Figure 7:
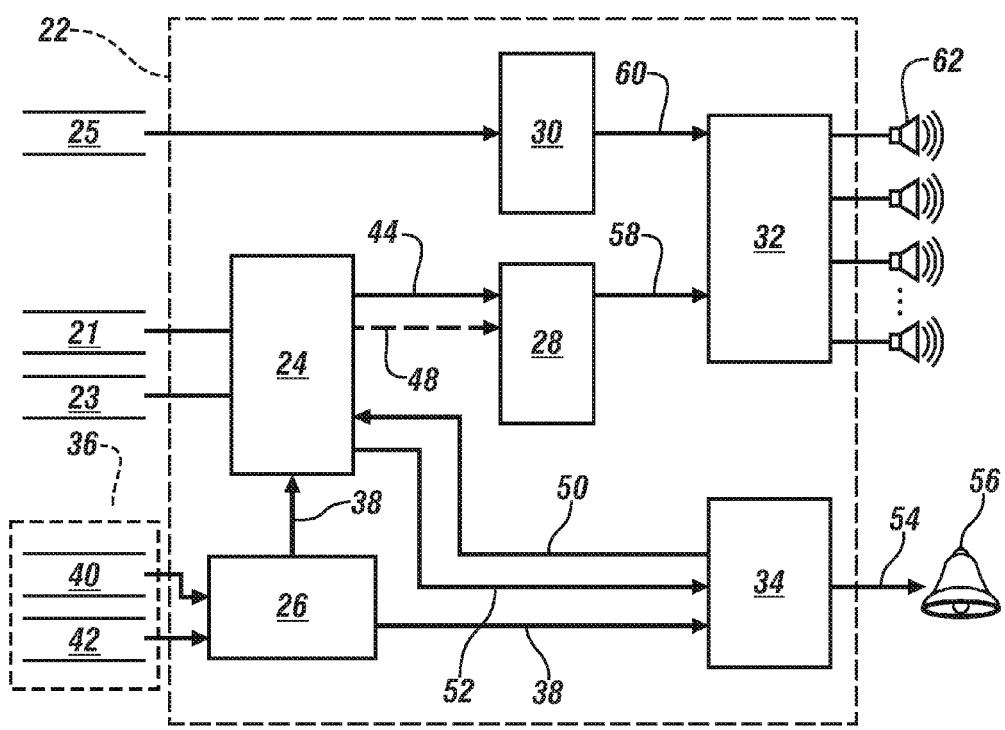
FIG. 7 is a dataflow diagram illustrating the vehicle electronics subsystem of FIG. 6.

FIG. 7 is a dataflow diagram illustrating the vehicle electronics subsystem 22 of FIG. 6. In the example of FIG. 7, the vehicle electronics subsystem 22 includes a selection module 24, a switching module 26, an FM radio tuner module 28, an AM radio tuner module 30, a receiver module 32, and a security module 34. The security module 34 may also be referred to as a body control module. As can be appreciated, various embodiments of the vehicle electronics subsystem 22 according to the present disclosure may include any number of modules. The modules 24-34 shown in FIG. 7 may be combined and/or further partitioned to similarly perform the functions and processes described herein. For example, one or more of the modules 24-34 can be located in different physical locations within the vehicle 10 of FIGS. 1 and 2 and need not be packaged in a common housing.

In the example of FIG. 7, the selection module 24 is electrically connected to the first and second signal paths 21 and 23 of FIG. 6. The switching module 26 receives various vehicle inputs 36 to determine a radio mode 38. The vehicle inputs 36 can include, for example, a key-in-ignition indication 40 and/or a radio powered-on indication 42. The vehicle inputs 36 can be based on sensors, switches, or signals determined by or derived from other modules (not depicted). Other signals known in the art may also or alternatively be included in the vehicle inputs 36 to determine whether to set the radio mode 38. The radio mode 38 is an indication that the FM antenna loop 16 of FIGS. 3-6 should be electrically connected to the FM radio tuner module 28 or that the anti-theft loop 17 of FIGS. 3-6 should be electrically connected to the security module 34. If, for example, the key-in-ignition indication 40 is set or the radio powered-on indication 42 is set, then the switching module 26 sets the radio mode 38 to "active". The radio mode 38 is output to the selection module 24 and may also be output to the security module 34.

The selection module 24 determines whether to electrically connect the first and second signal paths 21 and 23 to the FM radio tuner module 28 or the security module 34 based on the radio mode 38. For instance, the first signal path 21 and/or the second signal path 23 can be electrically connected to FM antenna paths 44 and/or 48 between the selection module 24 and the FM radio tuner module 28 when the radio mode 38 is active. The first and second signal paths 21 and 23 can be electrically connected to anti-theft paths 50 and 52 when the radio mode 38 is inactive such that the first and second signal paths 21 and 23 are not electrically connected to the FM radio tuner module 28 when the radio mode 38 is set inactive. Electrical isolation between the shared use of the FM antenna loop 16 and the anti-theft loop 17 by the FM radio tuner module 28 and the security module 34 may prevent damage to sensitive electronics and noise issues. Selection of signals for switching within the selection module 24 can be performed using any known switching technology, such as relays, transistors, multiplexers, and the like.

By receiving the radio mode 38, the security module 34 can determine when to drive electrical current on the anti-theft path 50 and check for return current on the anti-theft path 52. Upon detecting a loss of electrical continuity while the radio mode 38 is inactive, the security module 34 can drive an alarm output 54 to trigger an alarm 56. The alarm 56 can include any combination of audio and/or visual indications, including communication to a remote monitoring service.

The FM radio tuner module 28 provides an FM radio signal 58 to the receiver module 32. Similarly, the AM radio tuner module 30 in electrical communication with the third signal path 25 of FIG. 6 can provide an AM radio signal 60 to the receiver module 32. It will be understood that the receiver module 32 can also receive signals from other sources such as satellite radio (not depicted). The receiver module 32 drives one or more audio outputs 62 in the vehicle 10 of FIGS. 1 and 2.

While FIG. 7 represents an example configuration, other possible configurations of the vehicle electronics subsystem 22 are contemplated. For example, the security module 34 can be configured to only be active under conditions where operation of the FM radio tuner 28 is not possible, thereby ensuring non-contemporaneous use of the FM antenna loop 16 and the anti-theft loop 17 by the FM radio tuner module 28 and the security module 34.

Figure 8:
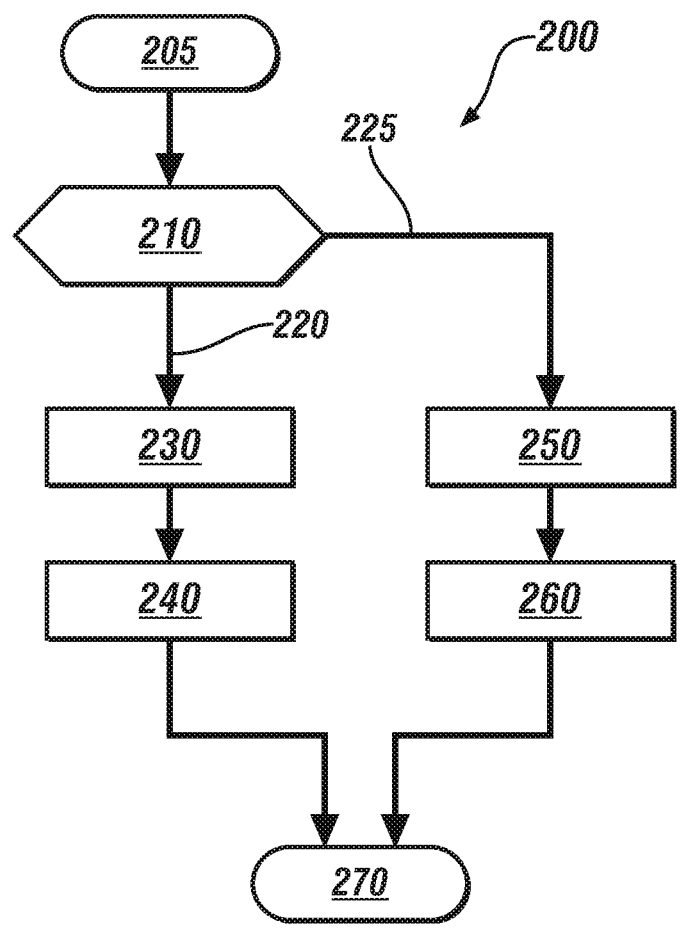
FIG. 8 is a process flow diagram illustrating one embodiment of a method that may be performed in the vehicle electronics subsystem of FIG. 7.

FIG. 8 is a process flow diagram illustrating one embodiment of a method 200 that may be performed in the vehicle electronics subsystem 22 of FIG. 7. Accordingly, the method 200 is described in reference to FIGS. 1-8. As can be appreciated in light of the disclosure, the order of operations within the method 200 is not limited to the sequential execution as illustrated in FIG. 8, but may be performed in one or more varying orders as applicable and in accordance with the present disclosure. As can further be appreciated, one or more steps may be added or removed without altering the spirit of the method.

Method 200 begins at block 205 and can be performed periodically (i.e., scheduled) or in response to a particular event (i.e., interrupt driven). At step 210, the switch module 26 of the vehicle electronics subsystem 22 determines whether a radio mode 38 is active based on one or more vehicle inputs 36, such as a key-in-ignition indication 40 and a radio powered-on indication 42. Based on determining that the radio mode 38 is active at decision point 220 where, for instance, the key-in-ignition indication 40 and/or the radio powered-on indication 42 are set, the method 200 continues to step 230.

At step 230, the radio mode 38 is set to active, and the method 200 continues to step 240. At step 240, the selection module 24 electrically connects at least one of the first and second signal paths 21 and 23 through the FM antenna paths 44 and/or 48 to the FM radio tuner module 28. The method 200 ends at block 270.

Based on determining that the radio mode 38 is inactive at decision point 225 where, for instance, neither the key-in-ignition indication 40 nor the radio powered-on indication 42 is set, the method 200 continues to step 250. At step 250, the radio mode 38 is set to inactive, and the method 200 continues to step 260. At step 260, the selection module 24 electrically connects the first and second signal paths 21 and 23 through the anti-theft paths 50 and 52 to the security module 34, and the method 200 ends at block 270.

As described above, the disclosed modules may be embodied in the form of computer implemented processes and apparatuses for practicing those processes. Embodiments may also be embodied in the form of computer program code containing instructions embodied in tangible media, such as floppy diskettes, CD-ROMs, DVDs, memory cards, memory chips, flash memory, hard drives, or any other computer readable storage medium, wherein, when the computer program code is loaded into and executed by a computer, the computer becomes an apparatus for practicing embodiments. An embodiment can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle system comprising:
   a vehicle glass assembly comprising:
      a glass pane of tempered glass;
      a frequency modulation (FM) antenna loop coupled to the glass pane and a first connector; and
      a second connector coupled to the FM antenna loop to form an anti-theft loop in conjunction with the first connector;
   a first signal path between the first connector and a vehicle electronics subsystem;
   a second signal path between the second connector and the vehicle electronics subsystem; and the vehicle electronics subsystem comprising a selection module configured to selectively electrically connect at least one of the first and second signal paths to an FM radio tuner module, and to selectively electrically connect the first and second signal paths to a security module when the first and second signal paths are not electrically connected to the FM radio tuner module.

2. The vehicle system of claim 1, further comprising an amplitude modulation (AM) antenna coupled to the glass pane and a third connector, the third connector electrically connected to a third signal path between the third connector and an AM radio tuner module.

3. The vehicle system of claim 1, further comprising a switch module configured to set a radio mode active based on one or more of: a key-in-ignition indication and a radio powered-on indication.

4. The vehicle system of claim 3, wherein the selection module electrically connects at least one of the first and second signal paths to the FM radio tuner module based on the radio mode being set active, and the selection module electrically connects the first and second signal paths to the security module based on the radio mode being set inactive.

5. The vehicle system of claim 4, wherein the security module is configured to detect a loss of electrical continuity in the anti-theft loop while the radio mode is set inactive.

6. The vehicle system of claim 5, further comprising:
a second vehicle glass assembly comprising:
a second glass pane of tempered glass;
a second FM antenna loop coupled to the second glass pane and a first connector of the second glass pane; and
a second connector of the second glass pane coupled to the second FM antenna loop to form a second anti-theft loop in conjunction with the first connector of the second glass pane; and
the vehicle electronics subsystem is electrically connected to the first and second connectors of the second glass pane.

7. The vehicle system of claim 6, wherein the second FM antenna loop is coupled to the second signal path such that a first portion of the second signal path is electrically connected between the second connector of the vehicle glass assembly and the first connector of the second vehicle glass assembly, and a second portion of the second signal path is electrically connected between the second connector of the second vehicle glass assembly and the vehicle electronics subsystem.

8. The vehicle system of claim 6, wherein the glass pane and the second glass pane are sized for rear quarter windows of a vehicle.

9. The vehicle system of claim 6, wherein the FM antenna loop and second FM antenna loop are formed from a silver-ceramic paste.

10. A method comprising:
determining, by a switch module of a vehicle electronics subsystem, that a radio mode is active based on one or more vehicle inputs;
electrically connecting, by a selection module of the vehicle electronics subsystem, at least one of a first and second signal paths to a frequency modulation (FM) radio tuner module based on the radio mode being set active, wherein the first signal path is between the vehicle electronics subsystem and a first connector of an FM antenna loop coupled to a glass pane of tempered glass of a vehicle glass assembly, and the second signal path is between the vehicle electronics subsystem and a second connector of the FM antenna loop that forms an anti-theft loop in conjunction with the first connector; and
electrically connecting, by the selection module of the vehicle electronics subsystem, the first and second signal paths to a security module based on the radio mode being set inactive such that the first and second signal paths are not electrically connected to the FM radio tuner module when the radio mode is set inactive.

11. The method of claim 10, wherein the one or more vehicle inputs comprise one or more of: a key-in-ignition indication and a radio powered-on indication.

12. The method of claim 10, wherein the security module is configured to detect a loss of electrical continuity in the anti-theft loop while the radio mode is set inactive.

13. The method of claim 10, wherein a second FM antenna loop on a second glass pane of tempered glass of a second vehicle glass assembly is coupled to the second signal path such that a first portion of the second signal path is electrically connected between the second connector of the vehicle glass assembly and a first connector of the second vehicle glass assembly, and a second portion of the second signal path is connected between a second connector of the second vehicle glass assembly and the vehicle electronics subsystem.

14. The method of claim 13, wherein the glass pane and the second glass pane are sized for rear quarter windows of a vehicle, and the FM antenna loop and the second FM antenna loop are formed from a silver-ceramic paste.

* * * * *